March 6, 1962 H. J. LANGLOIS ET AL 3,023,581
FLUID COUPLING
Filed Feb. 17, 1958 2 Sheets-Sheet 1

INVENTOR.
HENRY J. LANGLOIS
RICHARD M. NELDEN
BEN RAGLAND
BY
SMITH, WILSON, LEWIS & McRAE
ATTORNEYS

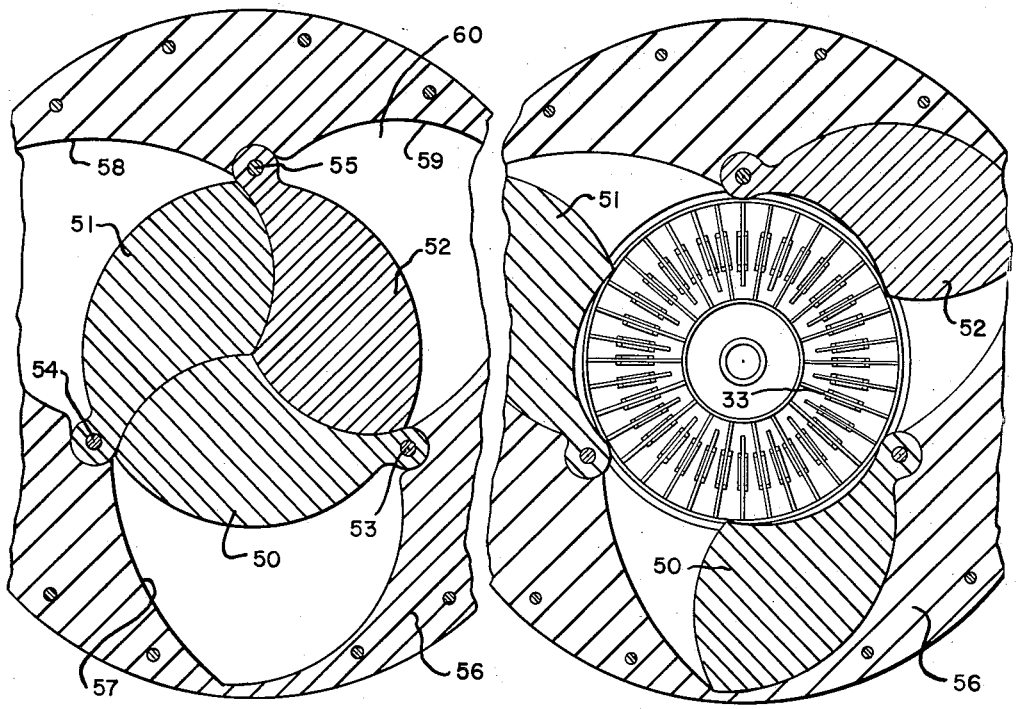
FIG. 5
FIG. 6
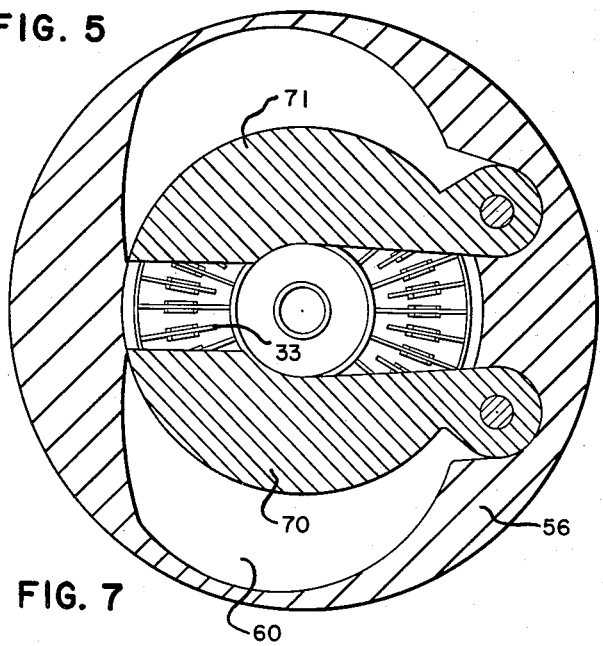
FIG. 7
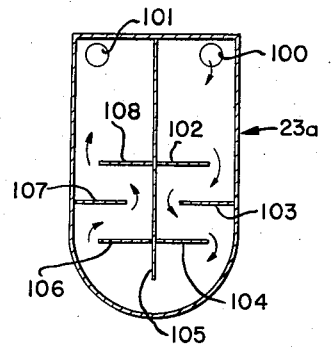
FIG. 4
*INVENTOR.*
HENRY J. LANGLOIS
BY RICHARD M. NELDEN
BEN RAGLAND
SMITH, WILSON, LEWIS & McRAE
ATTORNEYS United States Patent Office 3,023,581
Patented Mar. 6, 1962

3,023,581
FLUID COUPLING
Henry J. Langlois, Dearborn, and Richard M. Nelden and Ben Ragland, Birmingham, Mich., assignors to American Radiator & Standard Sanitary Corporation, New York, N.Y., a corporation of Delaware
Filed Feb. 17, 1958, Ser. No. 715,771
4 Claims. (Cl. 60—54)

This invention relates to a fluid coupling wherein economical means is provided for effecting a complete de-clutching of the driven shaft as well as a variable driven shaft speed.

Objects of the invention are to provide a variable speed fluid coupling wherein:

(1) simply constructed speed-varying mechanism is utilized in place of the costly scoop tube-pump structure heretofore employed, and (2) rapid de-clutching of the output shaft is provided by the same mechanism employed for the speed-varying, thereby eliminating the costly ring valve and piston valve mechanisms heretofore employed for rapid de-clutching operations.

(3) the de-clutching is not only rapid but fully complete, with a torque reducing to zero in the output shaft.

(4) the above advantages are obtained in a structure which employs a minimum number of moving parts, utilizes no precision mechanisms, is low in first cost, requires a minimum of maintenance, and has a substantially longer life than prior art structures.

Other objects of this invention will appear in the following description and appended claims, reference being had to the accompanying drawings forming a part of this specification wherein like reference characters designate corresponding parts in the several views.

In the drawings:

FIG. 4 is a sectional view through a baffle which may be employed in place of damper plate 23 in the FIG. 1 embodiment.

FIG. 5 is a view taken substantially along the same line as FIG. 2, but of a second embodiment of the invention.

FIG. 6 is a view in the same direction as FIG. 5, but showing certain damper plates in opened positions.

FIG. 7 is a view in the same direction as FIG. 2, but of a third embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figures 1, 2:
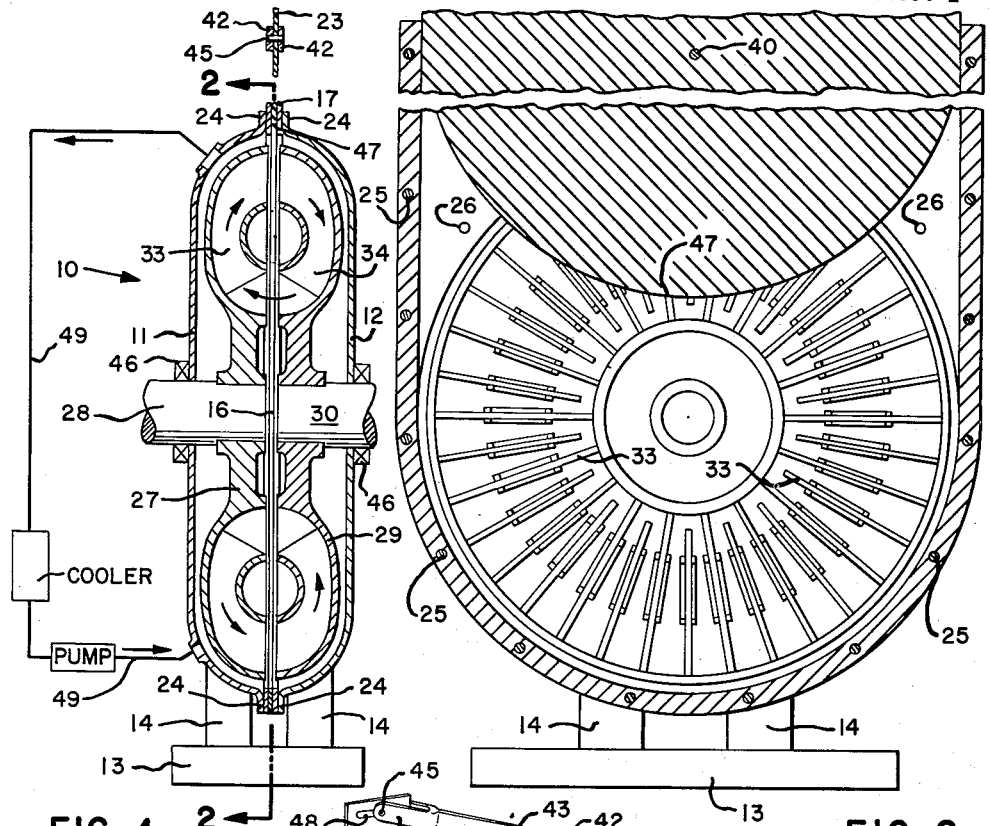
FIG. 1 is a sectional view through one embodiment of the invention.
FIG. 2 is a sectional view on line 2—2 in FIG. 1.
Figure 3:
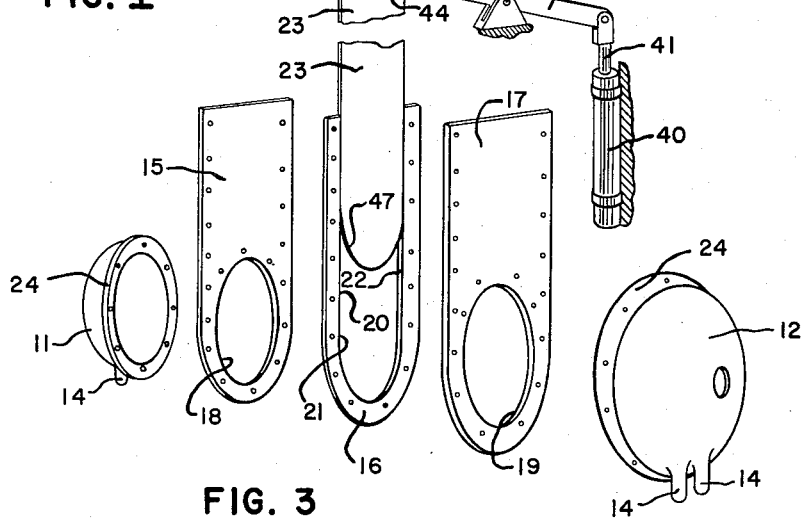
FIG. 3 is an "exploded" perspective view of certain mechanisms employed in the FIG. 1 embodiment.

In FIGS. 1 through 3 there is shown a fluid coupling or fluid drive 10 which includes two housing sections 11 and 12 of confronting concave configuration, each fixedly secured to a base plate 13 by support members 14. Between housing sections 11 and 12 there are provided three steel plates 15, 16 and 17. Plates 15 and 17 are provided with large circular openings 18 and 19 of substantially the same diameter as the internal diameter of the housing sections 11 and 12. Plate 16 is provided with a large elongated slot 20 which forms guide surfaces 21 and 22 for the slidable mounting of a damper plate 23. The three plates 15, 16 and 17 are held in "sandwich-like" fashion between flanges 24 on housing sections 11 and 12. Bolts 25 extend through flanges 24 and the three plates, while bolts 26 extend only through the flanges into the immediately adjacent plate so as not to interfere with the slidable movements of damper plate 23.

Plate 23 may be slidably moved to any selected position by means of a fluid cylinder 40, which is operated by control mechanism responsive to conditions occurring during operation of the fluid coupling. Cylinder 40 drives a piston rod 41, which in turn moves a lever 42 around fixed axis 43. The left end portion of lever 42 is bifurcated at 44 so as to extend along opposite faces of plate 23. A pin 45 extends through bifurcated portion 44 so as to be slidably engaged in a slot 48 in plate 23. The pin-slot arrangement enables lever 44 to have an arcuate movement around axis 43 while effecting vertical rectilinear movement of plate 23. In the FIG. 1 position plate 23 is positioned with its lower edge 47 above the housing chamber. In FIG. 2 plate 23 is positioned with its lower edge 47 within the housing chamber.

A pump or impeller 27 is positioned within housing section 11 and is fixedly secured to a driving shaft 28, powered by motor means not shown. A turbine rotor or runner 29 is positioned within housing section 12 and is secured to a driven or output shaft 30. Shaft seals 46 prevent oil leakage and maintain required oil volume in the fluid circuit.

Housing section 11 is connected with a hydraulic fluid line 49, which extends from a conventional cooler and pump structure, the arrangement being such that sufficient quantities of cooled hydraulic fluid are delivered into housing 10, 11 for proper operation of the unit. In operation, when plate 23 is set with its lower edge 47 in the FIG. 1 position the coupling may be operated at full speed. Thus, when the driving shaft 28 is rotated the vanes 33 of impeller 27 coact with the vanes 34 of runner 29 to provide a torroidal vortex flow as indicated by the arrows in FIG. 1. This vortex flow causes runner 29 to be driven at approximately the same speed as impeller 27 with only slight slippage therebetween.

By adjusting plate 23 downwardly to the FIG. 2 position a portion of the vortex flow is interrupted in a manner to decrease the speed of runner 29 and output shaft 30. In like manner additional downward adjustment of plate 29 is effective to further interrupt the vortex flow so as to further reduce the runner speed. When plate 29 is moved to the lower limit of its adjustment the vortex flow is completely interrupted so as to accomplish full de-clutching of the runner.

FIG. 4 illustrates a method of cooling the hydraulic fluid which may be employed in place of the arrangement shown in FIG. 1. FIG. 4 shows a hollow damper plate 23a which is provided with a cooling fluid inlet 100 and a cooling fluid outlet 101. Internal baffles are provided at 102 through 108 so as to cause the cooling fluid to travel in a sinuous path from the inlet to the outlet and thereby extract a maximum amount of heat from the hydraulic fluid surrounding the damper plate. With the FIG. 4 arrangement the FIG. 1 cooler is eliminated from line 49.

The FIG. 5 structure is similar to the FIG. 1 structure except that damper plate 23 has been replaced by three damper plates 50, 51 and 52 fixedly carried on rotary shafts 53, 54 and 55. Guide plate 16 has been replaced by a plate 56, which is formed with openings 57, 58 and 59 for reception of the respective damper plates when they are moved outwardly to their FIG. 6 positions. Plate 56 is "sandwiched" between two plates 60 (only one of which is visible in the drawings) in the same manner as plate 16. Movement of the damper plates is conveniently effected by control mechanisms operatively connected with exterior portions of shafts 53, 54 and 55.

In the FIG. 5 position of plates 50, 51 and 52 the impeller vanes 33 are wholly concealed from the runner vanes so that no vortex flow is possible. The runner is in a fully de-clutched condition.

In the FIG. 6 position the damper plates are positioned out of the space between the impeller and runner so as to permit vortex flow for causing the runner to operate at full speed. Intermediate positions of the damper plates are effective to give intermediate runner speeds.

The FIG. 7 structure is similar to the FIG. 5 structure except that only two pivotally mounted damper plates 70 and 71 are provided for controlling the vortex flow. It will be noted that the damper plates do not completely overlap the impeller vane area. As a result there is not a complete de-clutching of the runner when the damper plates are in the FIG. 7 position. However the device is effective to control vortex flow for varying the runner speed.

Each of the illustrated devices is of comparatively low cost construction so as to provide economical control of the fluid coupling runner speed.

We claim:

1. In a fluid coupling, a driving impeller and a driven runner cooperating therewith to define a power transmitting fluid circuit; fluid blocking means movable into the space between the impeller and runner to control fluid flow in the circuit; said blocking means being of hollow construction and having an inlet and an outlet in communication with its interior for the circulation of cooling fluid therethrough.

2. The combination of claim 1 and further comprising a series of baffles within the blocking means interior for causing the cooling fluid to travel in a sinuous path.

3. In a fluid coupling, a driving impeller and a driven runner cooperating therewith to define a power-transmitting fluid circuit; fluid-blocking means including at least one plate movable transverse to the coupling axis into and out of the space between the impeller and runner to control fluid flow in the circuit, said plate having a fluid inlet and fluid outlet communicating with the hollow interior for the circulation of cooling fluid therethrough, and means for mounting said fluid blocking means including parallel walls closely engaging opposite faces of the plate to reinforce same against deflection thereof by the force of the circuit fluid.

4. The combination defined in claim 3 wherein the interior of the plate is defined in part by a series of baffles for causing the cooling fluid to travel in a sinuous path while in the plate interior.

References Cited in the file of this patent

UNITED STATES PATENTS

| | | |
|---|---|---|
| 1,203,265 | Radcliffe | Oct. 31, 1916 |
| 1,226,380 | Riley | May 15, 1917 |
| 1,249,261 | Walker | Dec. 4, 1917 |
| 1,831,770 | Sinclair | Nov. 10, 1931 |
| 2,021,526 | Stock | Nov. 19, 1935 |
| 2,164,173 | Durrell et al. | June 27, 1939 |
| 2,245,684 | Kiep | June 17, 1941 |
| 2,464,215 | Copeland | Mar. 15, 1949 |
| 2,699,642 | Ahlen | Jan. 18, 1955 |
| 2,862,362 | Parshall | Dec. 2, 1958 |

FOREIGN PATENTS

| | | |
|---|---|---|
| 1,091,161 | France | Oct. 27, 1954 |